United States Patent
Yang et al.

(10) Patent No.: US 12,025,793 B1
(45) Date of Patent: Jul. 2, 2024

(54) WAVEFRONT CORRECTION SYSTEM BASED ON RUN OPTIMIZATION ALGORITHM

(71) Applicant: JINLING INSTITUTE OF TECHNOLOGY, Nanjing (CN)

(72) Inventors: Huizhen Yang, Nanjing (CN); Xiangdong Zang, Nanjing (CN); Ronggang Zhu, Nanjing (CN); Peng Chen, Nanjing (CN)

(73) Assignee: JINLING INSTITUTE OF TECHNOLOGY, Nanjing (CN)

( * ) Notice: Subject to any disclaimer, the term of this patent is extended or adjusted under 35 U.S.C. 154(b) by 0 days.

(21) Appl. No.: 18/610,749

(22) Filed: Mar. 20, 2024

Related U.S. Application Data

(63) Continuation of application No. PCT/CN2023/136021, filed on Dec. 4, 2023.

(30) Foreign Application Priority Data

Mar. 16, 2023 (CN) .......................... 202310254090.6

(51) Int. Cl.
*G02B 27/00* (2006.01)
*H04N 25/60* (2023.01)
*H04N 25/75* (2023.01)

(52) U.S. Cl.
CPC ......... *G02B 27/0068* (2013.01); *H04N 25/60* (2023.01); *H04N 25/75* (2023.01)

(58) Field of Classification Search
None
See application file for complete search history.

(56) References Cited

U.S. PATENT DOCUMENTS

| | | |
|---|---|---|
| 2015/0294134 A1 | 10/2015 | Giannozzi et al. |
| 2017/0332302 A1 | 11/2017 | Ercan et al. |

FOREIGN PATENT DOCUMENTS

| | | |
|---|---|---|
| BR | PI0504587 A | 6/2007 |
| CN | 102722023 A | 10/2012 |
| CN | 103901617 A | 7/2014 |

(Continued)

OTHER PUBLICATIONS

CNIPA, Notification of a First Office Action for CN202310254090.6, Sep. 4, 2023.

(Continued)

*Primary Examiner* — Mark T Monk
(74) *Attorney, Agent, or Firm* — Zhigang Ma

(57) ABSTRACT

Disclosed is a wavefront correction system based on a Runge-Kutta (RUN) optimization algorithm. The system includes a wavefront corrector, an image sensor, a lens, a computer control module, an image collection card, a digital-to-analog (D/A) converter, and a high-voltage amplifier. A performance index function representing a wavefront distortion correction degree is used as an optimization algorithm objective function, a RUN algorithm is used as a closed-loop correction system control algorithm, and the wavefront corrector is used as a wavefront distortion correction system device. The RUN algorithm controls the wavefront corrector to correct a wavefront aberration. During each iteration, a voltage control signal obtained through the algorithm is amplified and applied to the wavefront corrector, such that a mirror shape of the wavefront corrector is changed, and a corresponding corrected wavefront is generated.

1 Claim, 5 Drawing Sheets

(56) References Cited

FOREIGN PATENT DOCUMENTS

| CN | 105044906 A | 11/2015 |
|---|---|---|
| CN | 106875001 A | 6/2017 |
| CN | 108646407 A | 10/2018 |
| CN | 116400495 A | 7/2023 |

OTHER PUBLICATIONS

Jinling Institute of Technology (Applicant), Reply to Notification of a First Office Action for CN202310254090.6, w/replacement claims, Oct. 10, 2023.

Jinling Institute of Technology (Applicant), Supplemental Reply to Notification of a First Office Action for CN202310254090.6, w/ (allowed) replacement claims, Jan. 12, 2024.

CNIPA, Notification to grant patent right for invention in CN202310254090.6, Jan. 16, 2024.

WAVEFRONT CORRECTION SYSTEM BASED ON RUN OPTIMIZATION ALGORITHM

TECHNICAL FIELD

The present disclosure relates to the technical field of adaptive optics, and in particular to a wavefront correction system based on a Runge-Kutta (RUN) optimization algorithm.

BACKGROUND

Light has static or dynamic distortion after passing through a distorted medium or an incomplete imaging system. This situation seriously influences imaging performance of an optical system. An adaptive optical technology is a vital technical means in the field of wavefront aberration correction. It has been used in various fields, such as microscopic imaging, human retinal imaging, endoscope, beam shaping, and astronomical imaging.

A conventional adaptive optical system is high in cost and complex in structure because of existence of a wavefront sensor. The conventional adaptive optical system cannot be applied in fields requiring structure miniaturization. An adaptive optical system without wavefront detection can be miniaturized, because it requires no wavefront measurement link, which greatly reduces structure complexity. Therefore, it can be applied more widely than the conventional adaptive optical system. In recent years, several meta-heuristic algorithms have been used as control methods of the adaptive optical system without wavefront detection, including a genetic algorithm, a particle swarm optimization algorithm, a differential evolution algorithm, etc. When used as system control methods, the algorithms have low convergence speed or insufficient global search efficiency, making them difficult to apply.

SUMMARY

A technical problem to be solved by the present disclosure is to provide a wavefront correction system based on a Runge-Kutta (RUN) optimization algorithm. The system is miniaturized, low in value, high in convergence speed, strong in adaptability to wavefront distortion under different turbulence intensities, and capable of fully playing a correction role of a deformable mirror.

In order to solve the technical problem, the present disclosure provides a wavefront correction system based on a RUN optimization algorithm. The system includes: a wavefront corrector, an image sensor, a lens, a computer control module, an image collection card, a digital-to-analog (D/A) converter, and a high-voltage amplifier. A distorted wavefront reaches the image sensor via the lens. The computer control module controls the image collection card to collect a signal of the image sensor. A corresponding control signal is computed through the RUN optimization algorithm. The D/A converter transmits a control signal after digital-to-analog conversion to the high-voltage amplifier. The high-voltage amplifier amplifies the received control signal and drives the wavefront corrector to deform, such that the distorted wavefront is compensated for.

Accordingly, the wavefront correction method based on the RUN optimization algorithm includes following steps:

step 1, using a performance index function representing a wavefront distortion correction degree as an optimization algorithm objective function;

step 2, initializing each parameter of a control algorithm and setting a population number N to solve an l-dimensional optimization problem, where a value of l depends on an optimization parameter of an adaptive optical system and is generally equal to a unit number of the wavefront corrector;

step 3, generating an initial position of a population through an initialization formula, applying an initialized population to the wavefront corrector as a control parameter so as to deform the wavefront corrector, then reading image sensor information into the computer control module through the image collection card, computing an objective function, and analyzing a current global optimal solution $x_{gbest}$;

step 4, updating a position of each particle of the population;

step 5, updating the position of each particle of the population and correcting $x_{gbest}$, using an $x_{gbest}$ parameter as a control signal, amplifying and applying the control signal to the wavefront corrector by an amplifier for aberration correction, and completing a current iteration; and step 6, repeating the step 4 and the step 5, and completing closed-loop system correction when a global optimal control parameter satisfies a correction requirement or satisfies a preset termination condition.

Optionally, in the step 3, the population is initialized through a following formula:

$$x_{n,1} = DL1 + R*(DU1 - DL1) \quad (1)$$

$DL_1$ and $DU_1$ represent a lower boundary and an upper boundary of a search space, respectively. R is a random number in a range of [0,1].

Optionally, in the step 4, the updating the position of each particle of the population specifically includes following steps:

step 41, computing a gradient SM through a fourth-order Runge-Kutta mathematical method, then randomly generating the random number R between [0,1], and enabling, if R<0.5, a particle to enter an exploration stage, conducting a local search around a new position generated by $x_n$ (a current position) while conducting a global search in the search space, and updating a position $x_{n+1}$ according to a search result;

step 42, enabling, if R≥0.5, a particle to enter a development stage, conducting a local search around a new position generated by a current global optimal solution and an optimal solution of each iteration, and updating a position $x_{n+1}$ according to a development result; and step 43, improving, when R<0.5, quality of a solution through an enhanced solution quality (ESQ) stage.

Optionally, in the step 43, the improving, when R<0.5, quality of a solution through ESQ stage specifically includes following steps: generating a random number, where c is generally an integer between (1,10), it represents a current iteration number, and Iter represents a maximum iteration number; enabling, if w<1, a particle to enter a development stage, and obtaining a new position $x_{new2}$ according to a development result; enabling, if w≥1, a particle to enter an exploration stage, and obtaining a new position $x_{new2}$ according to an exploration result; and locally searching for and exploring, if a new solution $x_{new2}$ has no better adaptability than a current solution and a condition of R<w is satisfied, a promising region around $x_{new2}$, obtaining a new position $x_{new3}$, comparing adaptability of a solution of ESQ with adaptability of a current optimal solution, and completing position updating.

The present disclosure has beneficial effects as follows: firstly, the wavefront correction system based on the RUN optimization algorithm requires no wavefront sensor compared with a conventional adaptive optical system, therefore, the system is capable of being miniaturized, low in value, and widely used; secondly, the algorithm system conducts wavefront correction more efficiently and has a higher convergence speed compared with an existing meta-heuristic population algorithm wavefront correction system; and thirdly, the wavefront correction system based on the RUN optimization algorithm has a low probability of falling into a local extremum and strong adaptability to wavefront distortion under different turbulence intensities, and is capable of fully playing a correction role of a deformable mirror.

DETAILED DESCRIPTION OF THE EMBODIMENTS

Figure 1:
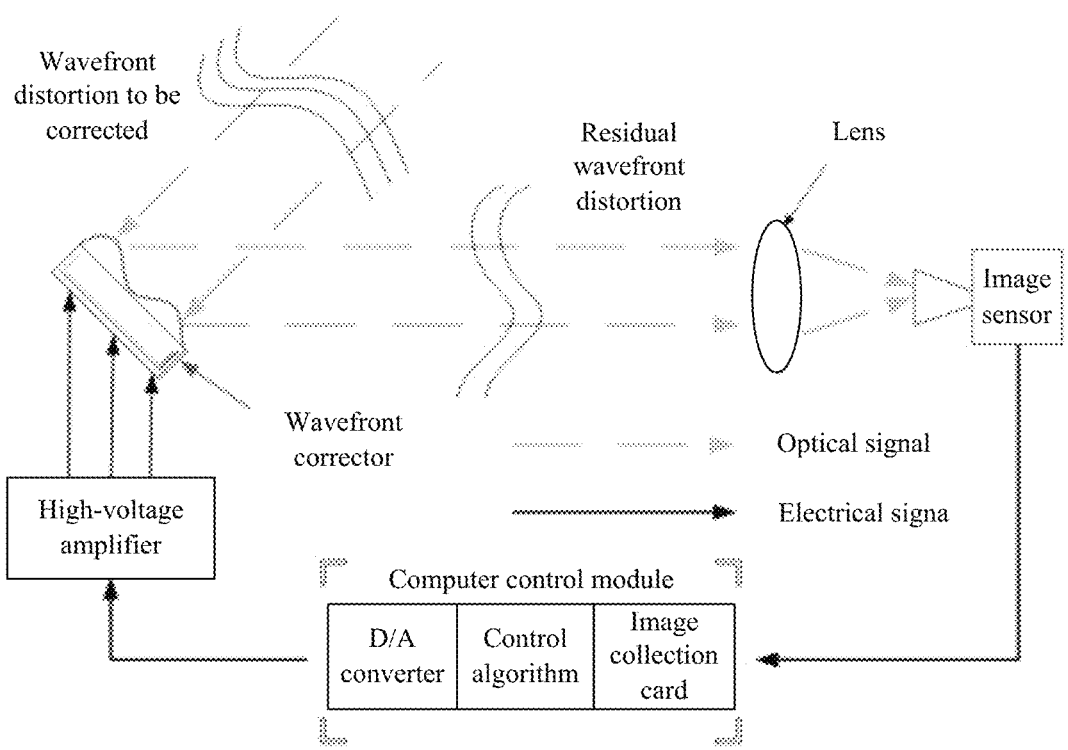
FIG. 1 is a schematic structural diagram of a system of the present disclosure.

As shown in FIG. 1, a wavefront correction system based on a Runge-Kutta (RUN) optimization algorithm includes: a wavefront corrector, an image sensor, a lens, a computer control module, an image collection card, a digital-to-analog (D/A) converter, and a high-voltage amplifier. A distorted wavefront reaches the image sensor via the lens. The computer control module controls the image collection card to collect a signal of the image sensor. A corresponding control signal is computed through the RUN optimization algorithm. The D/A converter transmits a control signal after digital-to-analog conversion to the high-voltage amplifier. The high-voltage amplifier amplifies the received control signal and drives the wavefront corrector to deform, such that the distorted wavefront is compensated for.

For instance, a 61-unit deformable mirror (DM) is used as the wavefront corrector, and a charge coupled device (CCD) is used as the image sensor. The system mainly consists of the DM, the CCD, the lens, the computer control module, the image collection card, a control algorithm, the digital-to-analog converter, and the high-voltage amplifier. When light passes through a distorted medium, a wavefront of an incident light wave is distorted, and distorted incident light is reflected by the 61-unit deformable mirror, and then reaches a CCD camera via the lens for imaging. The RUN control algorithm computes a control signal of the DM with an imaging signal collected by the image collection card. The digital-to-analog converter converts the control signal into an analog signal, and then the control signal is amplified by the high-voltage amplifier and applied to the deformable mirror, such that one time of closed-loop correction is completed.

Figure 2:
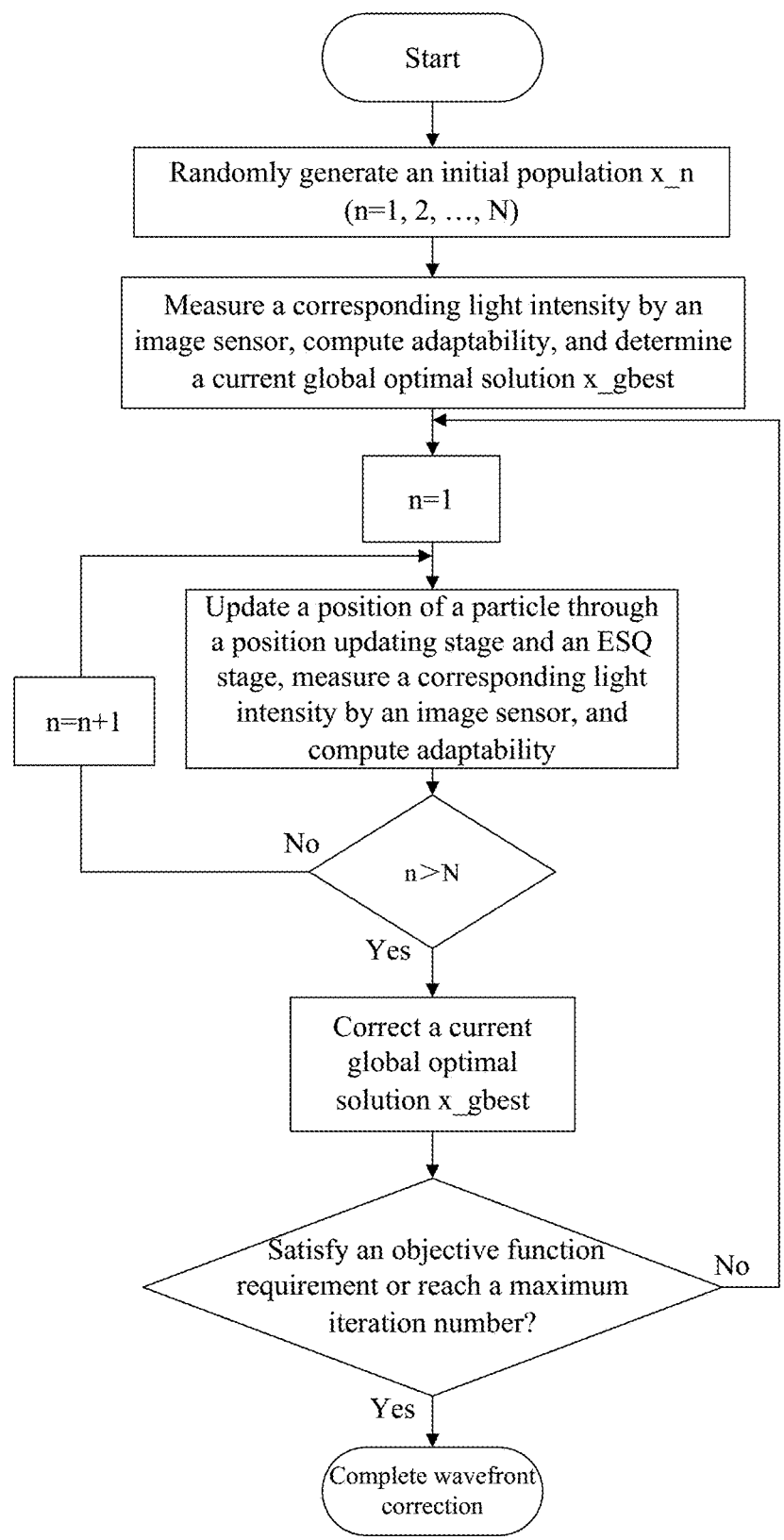
FIG. 2 is a schematic flow diagram of a method of the present disclosure.

As shown in FIG. 2, a wavefront correction method based on the RUN optimization algorithm includes following steps:

Step 1: a performance index function of a wavefront distortion correction degree is used as an optimization algorithm objective function. The objective function uses a mean radius (MR) as an instance. With correction of an adaptive optical (AO) system, the MR gradually becomes smaller when an aberration becomes smaller.

Step 2: each parameter of a control algorithm is initialized, and a population number N is set. According to the number of wavefront corrector drivers, a population particle dimension 1 is set to be 61.

Step 3: an initialized position of a population $x_n$ (n=1, 2, ..., N) is generated, an initial population parameter signal generated is amplified by an amplifier and applied to a DM driver, and a corresponding far-field light intensity is measured on the CCD. Corresponding adaptability is obtained through computation of a performance index MR in the objective function, and a current global optimal particle $x_{gbest}$ is determined.

Step 4: a position of each particle of the population is updated.

Step 4.1: a gradient SM is computed through a fourth-order Runge-Kutta mathematical method, then a random number R between [0,1] is randomly generated, and if R<0.5, a particle enters an exploration stage, a local search is conducted around a new position generated by $x_n$ while a global search is conducted in a search space, and a position of $x_{n+1}$ is updated with a search mechanism. A far-field light intensity after $x_{n+1}$ control parameter correction is measured by the image sensor. Corresponding adaptability is computed through a performance index in the objective function. A new position $x_{new}$ is determined with $J(x_{n+1})$ and $J(x_n)$.

Step 4.2: when R≥0.5, a particle enters a development stage, a local search is conducted around a new position generated by a current global optimal solution and an optimal solution of each iteration, and a position of $x_{n+1}$ is updated with a search mechanism. A far-field light intensity after $x_{n+1}$ control parameter correction is measured by the image sensor. Corresponding adaptability is computed through a performance index in the objective function. A new position $x_{new}$ is determined with $J(x_{n+1})$ and $J(x_n)$.

Step 4.3: when R<0.5, quality of a solution is improved through an enhanced solution quality (ESQ) stage. A random number w is generated, c is generally an integer between (1,10), it represents a current iteration number, and Iter represents a maximum iteration number. When w<1, a particle enters a development search stage. When w≥1, a particle enters an exploration search stage, such that a new position $x_{new2}$ is obtained. A far-field light intensity after $x_{new2}$ control parameter correction is measured by the image sensor. Corresponding adaptability is computed through a performance index in the objective function. $J(x_{new2})$ and $J(x_{new})$ are compared to determine a new position $x_{new}$. If a new solution $x_{new2}$ has no better adaptability than a current solution, a new position search stage is re-entered. If conditions of both $J(x_{new2})>J(x_{new})$ and R<w are satisfied, a promising region is searched for and explored locally around $x_{new2}$, and a new position $x_{new3}$ is obtained. A far-field light intensity after $x_{new3}$ control parameter correction is measured by the image sensor. Corresponding adaptability is computed through a performance index in the objective function. $J(x_{new3})$ and $J(x_{new})$ are compared to determine a new position.

Step 5: the position of each particle of the population is updated, and $x_{gbest}$ is corrected. An $x_{gbest}$ parameter signal is amplified by an amplifier and applied to a DM for correction, and a residual wavefront after DM correction is used as a wavefront to be corrected.

Step 6: when the algorithm satisfies a termination condition, a global optimal control parameter signal obtained is amplified by the amplifier and input into a deformable mirror driver, such that wavefront distortion correction is completed. When the algorithm does not satisfy the termination condition, the number of iterations is increased, and then the step 4 is returned to.

Figure 3A:
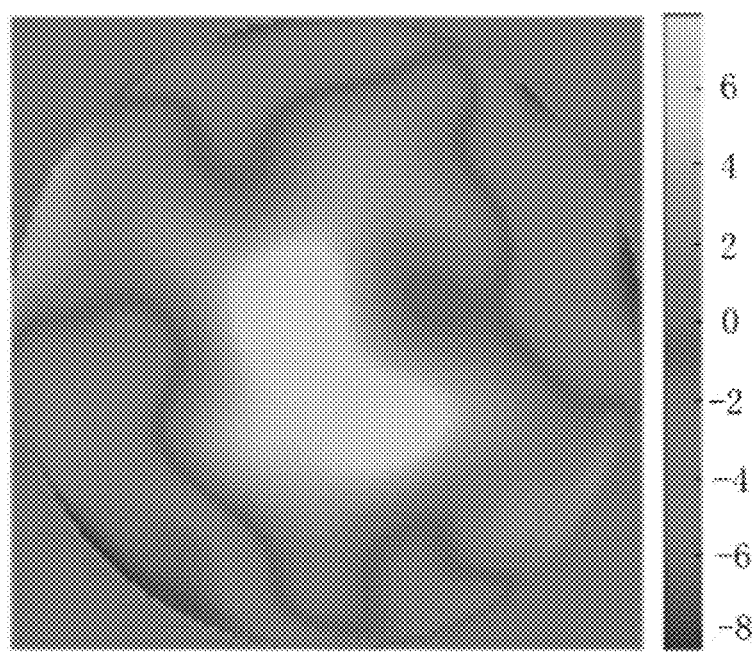
FIG. 3A shows an instance of wavefront distortion to be corrected according to the present disclosure.
Figure 3B:
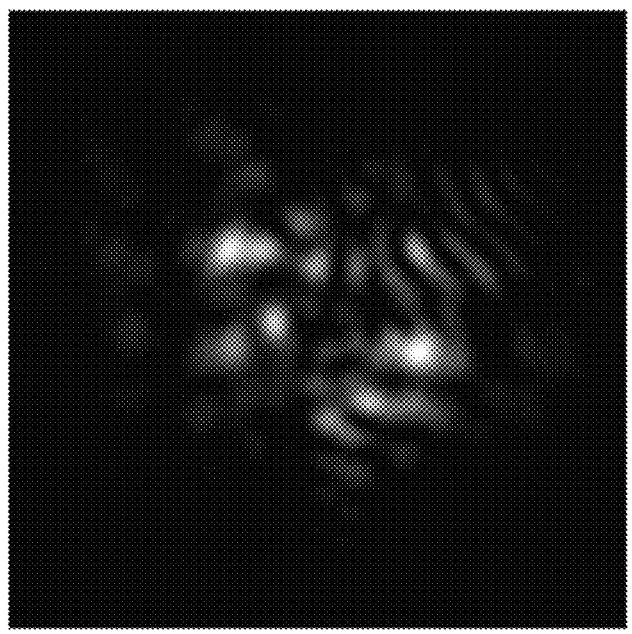
FIG. 3B is a point spread function diagram before correction corresponding to FIG. 3A.
Figure 3C:
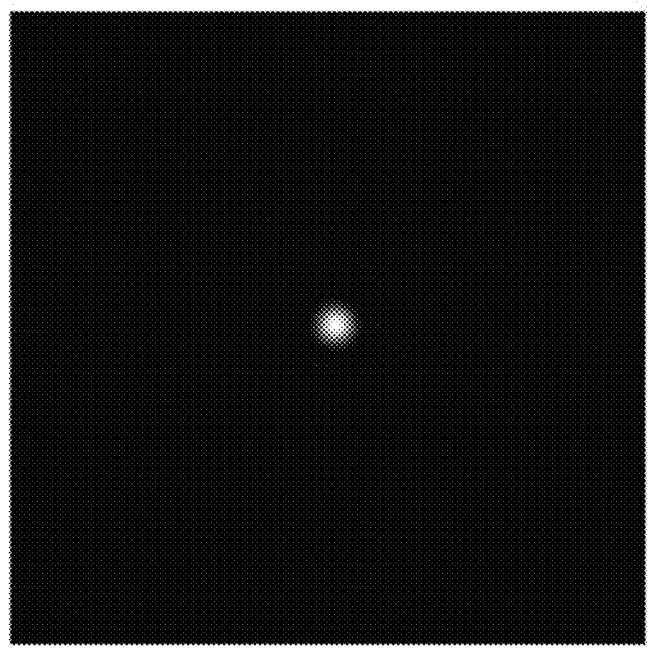
FIG. 3C is a point spread function diagram after correction corresponding to a residual wavefront.

FIG. 3A shows wavefront distortion to be corrected, FIG. 3B is a point spread function diagram before correction corresponding to FIG. 3A, and FIG. 3C is a point spread function diagram corresponding to a residual wavefront after correction through a wavefront correction system based on the RUN optimization algorithm.

According to the present disclosure, the performance index function representing the wavefront distortion correction degree is used as the optimization algorithm objective function, and the RUN algorithm is used as a closed-loop correction system control algorithm. The wavefront corrector is used as a wavefront distortion correction system device, and the wavefront corrector is controlled by the RUN algorithm to correct a wavefront aberration. During each iteration, a voltage control signal obtained through the algorithm is amplified and applied to the wavefront corrector, such that a mirror shape of the wavefront corrector is changed, and a corresponding corrected wavefront is generated.

What is claimed is:

1. A wavefront correction system based on a Runge-Kutta (RUN) optimization algorithm, comprising: a wavefront corrector, an image sensor, a lens, a computer control module, an image collection card, a digital-to-analog (D/A) converter, and a high-voltage amplifier, wherein a distorted wavefront reaches the image sensor via the lens, the computer control module controls the image collection card to collect a signal of the image sensor, a corresponding control signal is computed through the RUN optimization algorithm, the D/A converter transmits a control signal after digital-to-analog conversion to the high-voltage amplifier, and the high-voltage amplifier amplifies the received control signal and drives the wavefront corrector to deform, such that the distorted wavefront is compensated for, which specifically comprise following steps:

step 1, using a performance index function representing a wavefront distortion correction degree as an optimization algorithm objective function;

step 2, initializing each parameter of a control algorithm, and setting a population number N to solve an l-dimensional optimization problem, wherein a value of l depends on an optimization parameter of an adaptive optical system and is equal to a unit number of the wavefront corrector;

step 3, generating an initial position of a population through an initialization formula, applying an initialized population to the wavefront corrector as a control parameter so as to deform the wavefront corrector, then reading image sensor information into the computer control module through the image collection card, computing an objective function, and analyzing a current global optimal solution $x_{gbest}$; and initializing the population through a following formula:

$$x_{n,1} = DL_1 + R^*(DU_1 - DL_1) \quad (1)$$

in the formula, $DL_1$ and $DU_1$ represent a lower boundary and an upper boundary of a search space, respectively, and R is a random number in a range of [0,1];

step 4, updating a position of each particle of the population;

step 5, updating the position of each particle of the population and correcting $x_{gbest}$, using an $x_{gbest}$ parameter as a control signal, amplifying and applying the control signal to the wavefront corrector by an amplifier for aberration correction, and completing a current iteration, which specifically comprise following steps:

step 41, computing a gradient SM through a fourth-order Runge-Kutta mathematical method, then randomly generating the random number R between [0,1], and enabling, if R<0.5, a particle to enter an exploration stage, conducting a local search around a new position generated by a current position $x_n$ while conducting a global search in the search space, and updating a position $x_{n+1}$ according to a search result;

step 42, enabling, if R≥0.5, a particle to enter a development stage, conducting a local search around a new position generated by a current global optimal solution and an optimal solution of each iteration, and updating a position $x_{n+1}$ according to a development result; and step 43, improving, when R<0.5, quality of a solution through an enhanced solution quality (ESQ) stage; improving, when R<0.5, the quality of the solution through the ESQ stage specifically as follows: generating a random number w, wherein c is a constant, an integer between (1,10) is generally taken, it represents a current iteration number, and Iter represents a maximum iteration number; enabling, if w<1, a particle to enter a development stage, and obtaining a new position $x_{new2}$ according to a development result; enabling, if w≥1, a particle to enter an exploration stage, and obtaining a new position $x_{new2}$ according to an exploration result; and locally searching for and exploring, if a new solution $x_{new2}$ has no better adaptability than a current solution and a condition of R<w is satisfied, a promising region around $x_{new2}$, obtaining a new position $x_{new3}$, comparing adaptability of a solution of ESQ with adaptability of a current optimal solution, and completing position updating; and step 6, repeating the step 4 and the step 5, and completing closed-loop system correction when a global optimal control parameter satisfies a correction requirement or satisfies a preset termination condition.

* * * * *